US008985849B2

(12) United States Patent
Wenn et al.

(10) Patent No.: US 8,985,849 B2
(45) Date of Patent: Mar. 24, 2015

(54) HIGH RESOLUTION TEMPERATURE MEASUREMENT

(71) Applicant: Microchip Technology Incorporated, Chandler, AZ (US)

(72) Inventors: Darren Edward Noel Wenn, Buckinghamshire (GB); James E. Bartling, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 136 days.

(21) Appl. No.: 13/658,026

(22) Filed: Oct. 23, 2012

(65) Prior Publication Data

US 2013/0121372 A1 May 16, 2013

Related U.S. Application Data

(60) Provisional application No. 61/558,636, filed on Nov. 11, 2011.

(51) Int. Cl.
*G01K 7/16* (2006.01)
*G01K 3/10* (2006.01)
*G01K 7/34* (2006.01)
*G01K 7/22* (2006.01)

(52) U.S. Cl.
CPC .. *G01K 7/22* (2013.01); *G01K 7/34* (2013.01); *G01K 7/16* (2013.01)
USPC ............. 374/170; 327/513; 702/130; 702/99; 374/102; 374/184; 374/185

(58) Field of Classification Search
USPC ......... 374/183, 185, 184, 170, 171, 172, 101, 374/102; 702/99, 130, 136; 340/146.2, 500, 340/514, 526
See application file for complete search history.

(56) References Cited

U.S. PATENT DOCUMENTS

| | | | | |
|---|---|---|---|---|
| 4,030,363 A | * | 6/1977 | Halleck | 374/170 |
| 4,562,554 A | * | 12/1985 | Stixrud et al. | 712/36 |
| 4,669,049 A | * | 5/1987 | Kosednar et al. | 702/133 |
| 4,725,150 A | * | 2/1988 | Ishida et al. | 374/170 |
| 4,769,798 A | * | 9/1988 | Hayashi | 368/121 |
| 4,771,393 A | * | 9/1988 | Ishida et al. | 702/133 |
| 4,959,651 A | * | 9/1990 | Yamada | 341/131 |
| 4,982,350 A | | 1/1991 | Perna et al. | 702/89 |
| 5,116,136 A | * | 5/1992 | Newman et al. | 374/102 |
| 5,519,644 A | * | 5/1996 | Benton | 702/88 |
| 5,567,052 A | * | 10/1996 | Yoshiike et al. | 374/124 |

(Continued)

FOREIGN PATENT DOCUMENTS

| | | | | |
|---|---|---|---|---|
| EP | 0594483 A1 | 4/1994 | ............ | G01D 18/00 |
| EP | 594483 A1 | * | 4/1994 | |

OTHER PUBLICATIONS

International Search Report and Written Opinion, Application No. PCT/US2012/064097, 15 pages, Nov. 29, 2013.

*Primary Examiner* — Gail Kaplan Verbitsky
(74) *Attorney, Agent, or Firm* — King & Spalding L.L.P.

(57) ABSTRACT

Temperature is determined by measuring the time it takes to charge a capacitor with a resistive temperature sensor. A clock, time counter, a voltage comparator and voltage reference are used in determining a coarse time measurement. The time measurement resolution is enhanced with the addition of a constant current source charging another timing capacitor within a single clock pulse time to provide a fine time measurement.

13 Claims, 6 Drawing Sheets

(56) References Cited

U.S. PATENT DOCUMENTS

| | | | | |
|---|---|---|---|---|
| 5,638,418 A * | 6/1997 | Douglass et al. | | 377/25 |
| 6,115,441 A * | 9/2000 | Douglass et al. | | 377/25 |
| 6,369,563 B1 * | 4/2002 | Krahe et al. | | 324/207.13 |
| 6,681,135 B1 * | 1/2004 | Davis et al. | | 607/21 |
| 6,996,491 B2 | 2/2006 | Gold et al. | | 702/132 |
| 7,932,323 B1 * | 4/2011 | Botros et al. | | 525/255 |
| 8,032,323 B2 * | 10/2011 | Taylor | | 702/130 |
| 8,331,203 B2 * | 12/2012 | La Rosa | | 368/113 |
| 8,672,542 B2 * | 3/2014 | Parmet et al. | | 374/185 |
| 2002/0094010 A1 | 7/2002 | Vail et al. | | 374/183 |
| 2003/0193843 A1 * | 10/2003 | Krahe et al. | | 368/113 |
| 2007/0005288 A1 | 1/2007 | Pattee et al. | | 702/125 |
| 2007/0064768 A1 * | 3/2007 | Taylor | | 374/170 |
| 2007/0267287 A1 * | 11/2007 | Saito et al. | | 204/157.47 |
| 2008/0169826 A1 * | 7/2008 | Bartling | | 324/658 |
| 2009/0281760 A1 * | 11/2009 | Taylor | | 702/130 |
| 2010/0001780 A1 * | 1/2010 | Janot | | 327/335 |
| 2013/0176037 A1 * | 7/2013 | Waki et al. | | 324/658 |

* cited by examiner

HIGH RESOLUTION TEMPERATURE MEASUREMENT

RELATED PATENT APPLICATION

This application claims priority to commonly owned U.S. Provisional Patent Application Ser. No. 61/558,636; filed Nov. 11, 2011; entitled "High Resolution Temperature Measurement," by Darren Edward Noel Wenn and James E. Baffling; which is hereby incorporated by reference herein for all purposes.

TECHNICAL FIELD

The present disclosure relates to the measurement of temperature with high resolution, high sampling rates and low power operation.

BACKGROUND

Many applications require the measurement of temperature with a high degree of resolution. For example, in industrial/chemical process control a resolution of less than 0.1° C. may be desirable. In biological sensing applications, a resolution of less than 0.01° C. may be desirable. Temperature measurement may be performed on mammals, e.g., humans or animals, for example to determine mammalian ovulation timing by measuring a change in body basal temperature. This change is typically from about 0.05° C. to about 0.25° C. over 2 to 5 hours. Readings have to be taken over long periods of time so a low power temperature measurement system is required (e.g., 5-6 months lifetime with 16 readings/second). Additional applications include livestock monitoring and crop analysis.

High resolution measurement can be performed in a number of ways. For example, direct reading of resistance in the case of thermistors and resistive temperature devices (RTD) or direct reading of a derived measurement such as voltage using an analog-to-digital converter (ADC) may be used. When using either technique the resolution thereof may be enhanced with a high resolution Delta-Sigma analog-to-digital converters (ADC). To provide high resolution measurement of temperature, existing measurement solutions have used the Delta-Sigma ADC, however, use thereof typically limits the sampling rate to less than 500 Hz and causes problems in low power applications due to the conversion time and circuit power demand. Furthermore the delays and settling times inherent in such a temperature measurement system means that it must be turned on for long periods of time before a valid result can be generated, limiting thereby its use in a low-power system.

Furthermore, high resolution temperature measurement requires low noise, long sampling times and many temperature measurement observations. This limits the applicability to battery powered modules which must operate for many months. Existing techniques for measuring temperature using a counter and comparator provide a result limited directly by the resolution of the counter clock. All known existing methods reference this way of measuring temperature and suggest enhancing temperature measurement resolution by increasing the counter clock rate. However, increasing the counter clock rate has a resulting impact on the current consumed by the temperature measuring system and limits its applicability for use in low power systems, e.g., battery powered operation.

SUMMARY

Hence, there exists a need for a method, system and apparatus for high resolution measurement of temperature over a large temperature range using high sample rates and low power consumption.

According to an embodiment, a method for measuring high resolution temperature may comprise the steps of: synchronously measuring a coarse time required to charge a first capacitor to a predefined voltage through a resistive temperature sensor with a time counter that counts clock pulses representing time intervals determined by a clock frequency; asynchronously measuring a fine time with a charge time measurement unit (CTMU), wherein the CTMU begins charging a second capacitor when the charge on the first capacitor is at the predefined voltage and ends at a next clock pulse, whereby the resulting voltage on the second capacitor is used in determining the fine time; determining a high resolution charge time by subtracting the fine time from the coarse time; and determining a high resolution temperature from the high resolution charge time.

According to a further embodiment of the method, the coarse time measurement and the fine time measurement may be coupled to a digital processor, wherein the digital processor may determine the high resolution temperature from the coarse and the fine time measurements. According to a further embodiment of the method, the step of coupling the coarse time measurement to the digital processor may comprise the step of reading a count value from the clocked time counter. According to a further embodiment of the method, the step of coupling the CTMU time measurement to the digital processor may comprise the step of converting the resulting voltage on the second capacitor of the CTMU to a digital representation thereof with an analog-to-digital converter (ADC) and reading the digital representation of the resulting voltage into the digital processor.

According to a further embodiment of the method, the step of determining the high resolution temperature from the coarse and the fine times with the digital processor may comprise the steps of subtracting the fine time measurement from the coarse time measurement and using a resulting difference time thereof to look up a corresponding high resolution temperature in a time-temperature look-up table stored in a memory associated with the digital processor. According to a further embodiment of the method, the step of determining the high resolution temperature from the coarse and the fine times with the digital processor may comprise the steps of subtracting the fine time measurement from the coarse time measurement and using a difference time thereof to calculate a corresponding high resolution temperature.

According to a further embodiment of the method, the step of calculating the high resolution temperature may comprise the step of calculating the high resolution temperature using a Steinhart-Hart equation. According to a further embodiment of the method, the digital processor and memory may be provided in a microcontroller. According to a further embodiment of the method, the resistive temperature sensor may be a thermistor. According to a further embodiment of the method, the resistive temperature sensor may be a resistive temperature device (RTD).

According to another embodiment, an apparatus for measuring high resolution temperature may comprise: a clock providing a plurality of clock pulses, each of the plurality of clock pulses representing a coarse time increment; a counter having a clock input coupled to the clock for receiving the plurality of clock pulses, and a stop input for stopping the counter from counting a count value, wherein the count value represents a number of clock pulses counted by the counter; a first output driver having an output coupled to a first node; a second output driver having an output coupled to a second node; a resistive temperature sensor coupled between the first and second nodes; a charging capacitor coupled to the second node and a voltage common node; a voltage reference having a reference voltage output; a voltage comparator having a positive input coupled to the second node and a negative input coupled to the output of the voltage reference, wherein the voltage comparator compares a voltage on the charging capacitor coupled to the second node to the reference voltage from the voltage reference output; a charge time measurement unit (CTMU) for providing a timed charge to a CTMU timing capacitor; wherein when outputs of the first and second output drivers go from first logic levels to second logic levels the counter starts counting the number of clock pulses until after a voltage on the charging capacitor coupled to the second node is equal to the reference voltage, the CTMU starts the timed charge to the CTMU timing capacitor when the voltage on the charging capacitor is equal to the reference voltage and stops the timed charge at a next clock pulse from the clock; a digital processor for reading the count value from the counter, a voltage on the CTMU timing capacitor, calculating a coarse time from the count value, and a fine time from the voltage on the CTMU timing capacitor; and the digital processor further subtracts the fine time from the coarse time and thereafter converts a resulting difference time to a temperature value.

According to a further embodiment, the CTMU may comprise: the CTMU timing capacitor; a constant current source; and first, second and third switches, wherein when the first and second switches are closed the timing capacitor has no charge thereon and when the third switch is open the constant current source is not connected to the timing capacitor, and when the first and second switches are open and the third switch is closed the constant current source is connected to the timing capacitor and charges the CTMU timing capacitor with the CTMU timed charge.

According to a further embodiment, the CTMU timed charge is represented by a voltage on the timing capacitor, an analog-to-digital converter (ADC) converts the voltage to a digital representation thereof, and the digital representation may be read by the digital processor. According to a further embodiment, a memory coupled to the digital processor may store a time-to-temperature table, wherein the digital processor may use a time-to-temperature table to determine the temperature value from the difference time.

According to a further embodiment, the digital processor may calculate the temperature value from the difference time. According to a further embodiment, the digital processor and memory may be provided in a microcontroller. According to a further embodiment, the resistive temperature sensor may be a thermistor. According to a further embodiment, the resistive temperature sensor may be a resistive temperature device (RTD). According to a further embodiment, a temperature display may be coupled to the digital processor for displaying the temperature value. According to a further embodiment, the second output driver may be an open collector output driver. According to a further embodiment, the second output driver may be a tri-state output driver. According to a further embodiment, the clock, counter, first and second output drivers, voltage comparator, CTMU and digital processor may be fabricated on an integrated circuit die. According to a further embodiment, the integrated circuit die may be packaged in an integrated circuit package.

BRIEF DESCRIPTION OF THE DRAWINGS

A more complete understanding of the present disclosure may be acquired by referring to the following description taken in conjunction with the accompanying drawings wherein.

Figure 1:
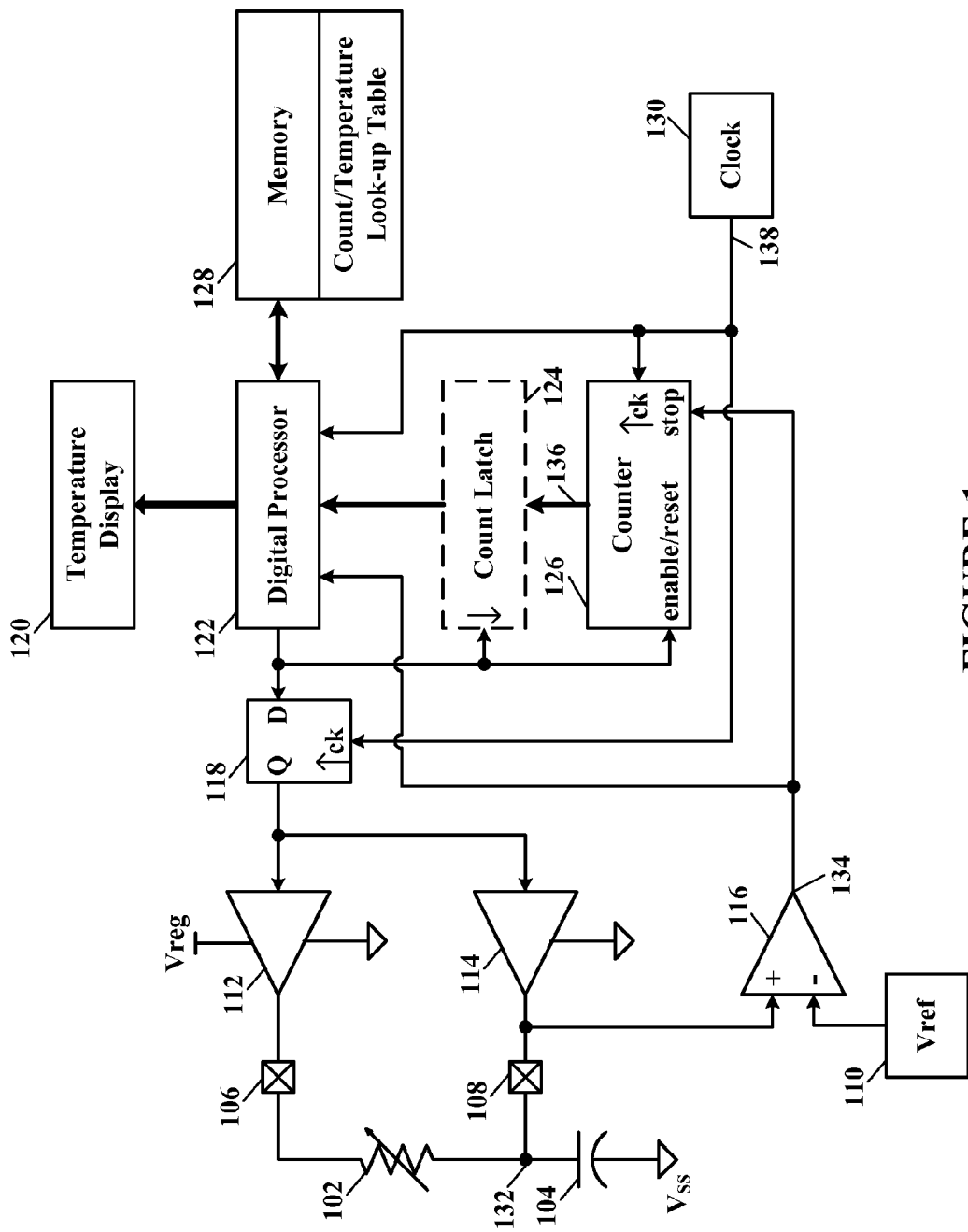
FIG. 1 illustrates a schematic block diagram of a temperature measurement circuit using a resistive temperature sensor and a counter timer, according to the teachings of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

A lower power demand, but still very accurate way to measure temperatures with a resistive temperature measurement sensor, e.g., Resistive Temperature Device (RTD), Thermistor, etc., is to charge a known value capacitor to a certain voltage value through the resistive temperature measurement sensor and determine the time that it takes to reach that certain voltage value. The resistive temperature measurement sensor is connected between a known value voltage source and the known value capacitor. Temperature measurement applications using resistive temperature measurement sensors are more fully described in Microchip Application Notes AN929, by J. Lepkowski, and AN679 by B. Baker, available at www-.microchip.com, both of which are incorporated by reference herein for all purposes.

According to the teachings of this disclosure, traditional time-based temperature measurement using a charging capacitor and time counter may be enhanced with the addition of a residual (fine) temperature measurement providing greater than a one hundred times increase in temperature resolution.

Referring now to the drawings, the details of a specific example embodiment is schematically illustrated. Like elements in the drawings will be represented by like numbers, and similar elements will be represented by like numbers with a different lower case letter suffix.

Referring to FIG. 1, depicted is a schematic block diagram of a temperature measurement circuit using a resistive temperature sensor and a counter timer, according to the teachings of this disclosure. A resistive temperature measuring sensor 102 is coupled to a capacitor 104 having a known capacitance value. The resistance value of the temperature measuring sensor 102 is dependant upon the ambient temperature surrounding it. Some temperature measuring sensors 102 have positive temperature coefficients and some have negative temperature coefficients. Either way, each resistance value has a corresponding temperature value, and by determining the resistance value of the temperature measuring sensor 102 at any given time, a temperature may be determined therefrom.

Operationally, output drivers 112 and 114 are first each driven to have an output at substantially zero (0) volts. This removes any voltage charge on the capacitor 104 and any residual charge on the temperature measuring sensor 102. When a temperature measurement is to be taken, the output of the driver 112 is driven high to Vreg, e.g., $V_{DD}$, and the output of the driver 114 goes to a high impedance, e.g., open collector, tri-state, etc. Now that a voltage, Vreg, is on terminal 106, current flows through the temperature measuring sensor 102 and begins charging the capacitor 104. Contemporaneously, a timing counter 126 begins counting time intervals at a clock rate determined by the frequency of the clock pulses 138 from the clock 130. A comparator 116 monitors the voltage on the capacitor 104 and when that voltage is equal to or greater than a reference voltage from a voltage reference 110, an output 134 of the comparator 116 goes to a logic high ("1"), thereby stopping the timing counter 126 from counting.

A D flip-flop 118 may be used to synchronously start the aforementioned operation on a rising edge of a clock pulse from the clock 130. The counter 126 counts clock pulses 138 until the charge voltage on the capacitor 104 is equal to the reference voltage, then the output 134 of the comparator 116 goes to a logic high ('1") which causes the counter 126 to stop counting. After the counter 126 stops counting, a digital processor 122 reads the count value therefrom. A intermediate count latch 124 may also be used to capture this count value but is generally not required.

The count value may then be compared to a table of count values and the respective temperature values stored in a memory 128. It is contemplated and within the scope of this disclosure that any type of non-volatile memory 128 may be used to store this table. Also the digital processor 122 may compute the temperature from the count value through known formulas and/or curve fitting techniques, e.g., Steinhart-Hart equation. Once the temperature has been determined from the count value, it may be displayed on a temperature display 120 and/or stored in memory for future use. A communications link (not shown) may also be used with the digital processor 122 to transmit temperature readings to a data acquisition system (not shown). The digital processor 122 may be, for example but is not limited to, a microcontroller, a microprocessor, an application specific integrated circuit (ASIC), a programmable logic array(PLA), a digital signal processor (DSP), etc.

For example, using a 33 kilohm thermistor and clock frequency of 16 MHz, 62.5 ns Tcyc; a 1° C. change at room temperature is about a 1525 ohm change (25° C. to 26° C.). If the capacitor 104 has a capacitance value of 6.8 nF, charging this capacitor 104 to 1.03/3.3 volts, where Vreg is 3.3 volts, the count time taken will change by 62 counts. Therefore the approximate resolution is 0.016° C.

Figure 2:
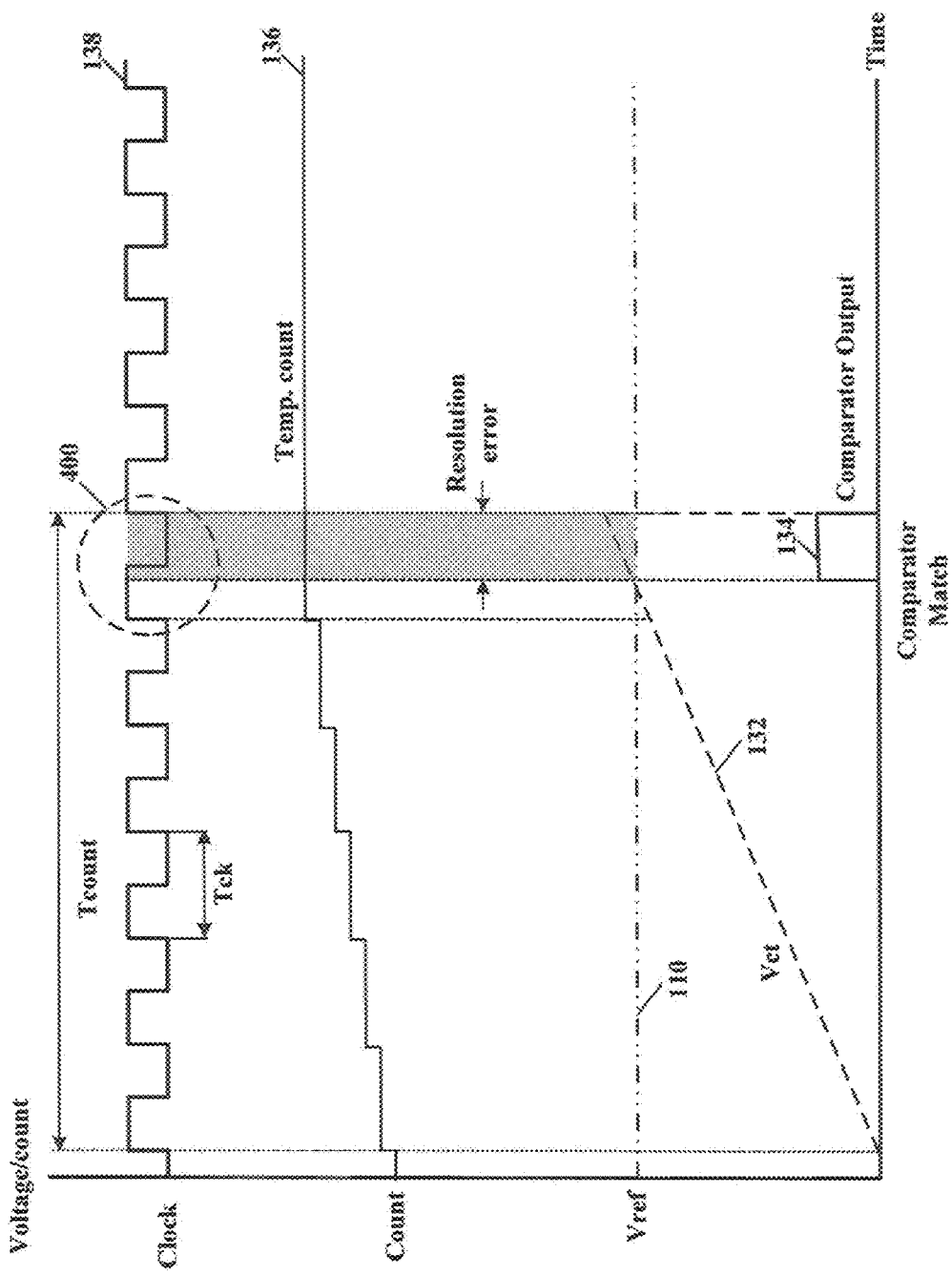
FIG. 2 illustrates a schematic graph showing voltage amplitude, and count values versus time of the temperature measurement circuit shown in FIG. 1, according to the teachings of this disclosure.

Referring to FIG. 2, depicted is a schematic graph showing voltage amplitude, and count values versus time of the temperature measurement circuit shown in FIG. 1, according to the teachings of this disclosure. The counter 126 time counting, Tcount, starts synchronously at a rising edge of a clock pulse 138 and its count increments at each rising edge of the clock pulses 138 until just after the voltage 132, Vct, on the capacitor 104 is equal to the reference voltage, Vref, from the voltage reference 110. When that occurs the counter 126 will be inhibited from further counting after the next rising edge of a clock pulse 138. However, there is an ambiguity in this voltage/temperature measurement as the voltage 132, Vct, on the capacitor 104 may be equal to the reference voltage, Vref, asynchronously at any time between the rising edges of clock pulses 138. This is represented by the "resolution error" 400. Reduction of the resolution error 400 may be accomplished by increasing the clock frequency and the number of bits of the counter 126. This improves the granularity of the count versus time, but also substantially increases power demand which is not desirable in a battery powered temperature measurement system used over long periods of time.

Figure 3:
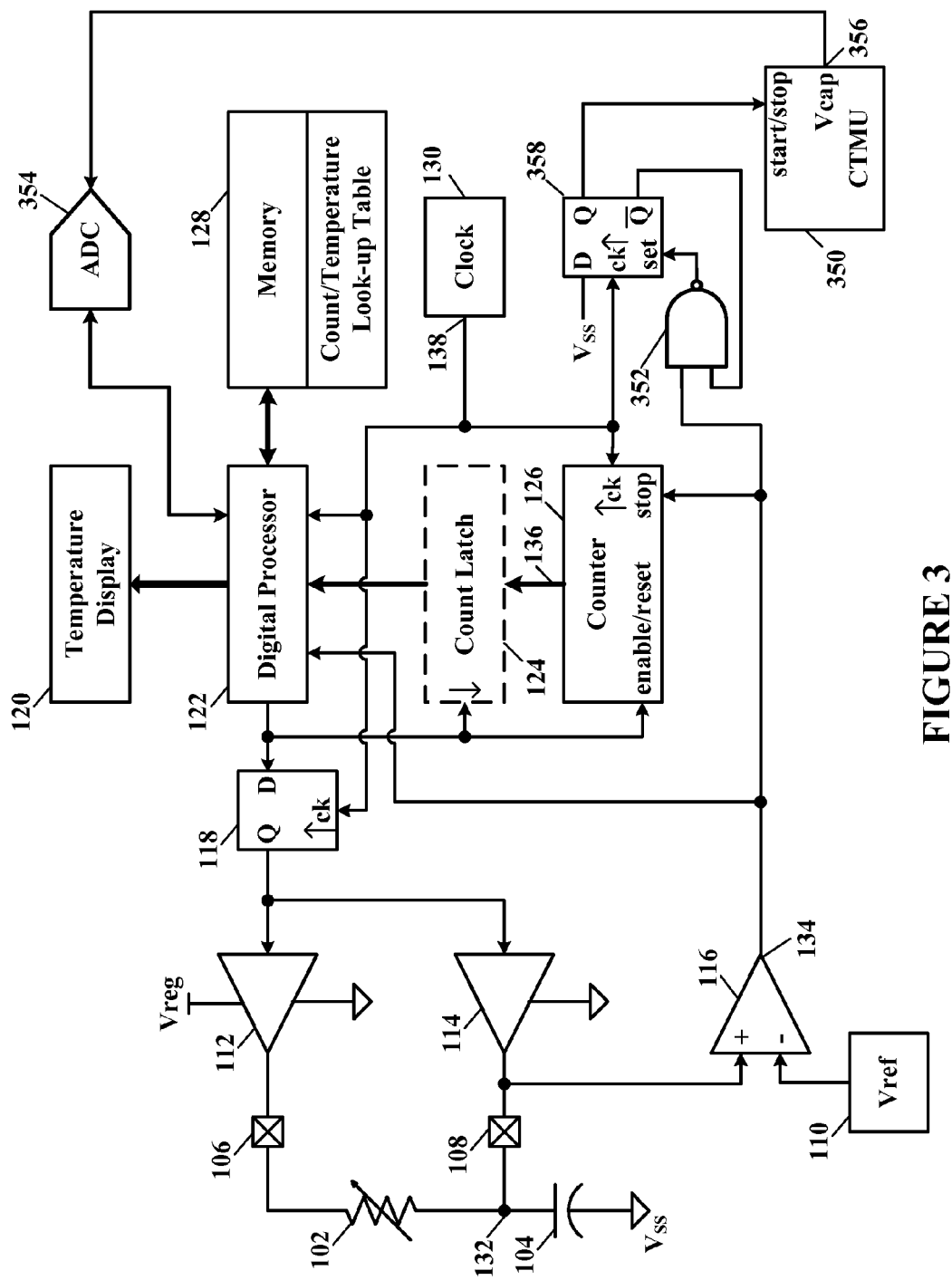
FIG. 3 illustrates a schematic block diagram of a temperature measurement circuit using a resistive temperature sensor, a counter timer and a charge time measurement unit (CTMU), according to a specific example embodiment of this disclosure.

Referring to FIG. 3, depicted is a schematic block diagram of a temperature measurement circuit using a resistive temperature sensor, a counter timer and a charge time measurement unit (CTMU), according to a specific example embodiment of this disclosure. The counting and voltage comparison circuits shown in FIG. 3 work substantially the same as those circuits shown in FIG. 1, but with the addition of a fine resolution timing circuit comprising a charge time measurement unit (CTMU) 350, synchronizing logic comprising flip-flop 358 and NAND gate 352, and an analog-to-digital converter (ADC) 354. The aforementioned circuits and logic may be fabricated on an integrated circuit die (not shown), and the integrated circuit die may be enclosed in an integrated circuit package (not shown). Nodes 106 and 108 may be connections (pins) on the integrated circuit package that connects to the external resistive temperature sensor 102 and charging capacitor 104. The capacitor 104 may also be internal to the integrated circuit device (not shown).

The purpose of the fine resolution timing circuit is to better define the actual asynchronous time at which the voltage 132, Vct, on the capacitor 104 is equal to the reference voltage, Vref. Since the CTMU 350 is an analog timing circuit it has substantially infinite resolution, wherein the actual timing resolution is limited only by the resolution of the ADC 354. However, since the time measurement required of the CTMU 350 is only one clock time, Tck, and the resolution of the ADC 354 may be 10 bits, this results in a resolution that is many times greater than the resolution of the counter 124 and clock 130 (see FIG. 4). The combined result of the coarse and fine time measurements provides resolution exceeding the theoretical resolution of the resistive temperature sensor. An analog voltage value 356 is sampled and converted into a digital representation by the ADC 354 then read into the digital processor 122 where it is converted into a fine time value.

Figure 4:
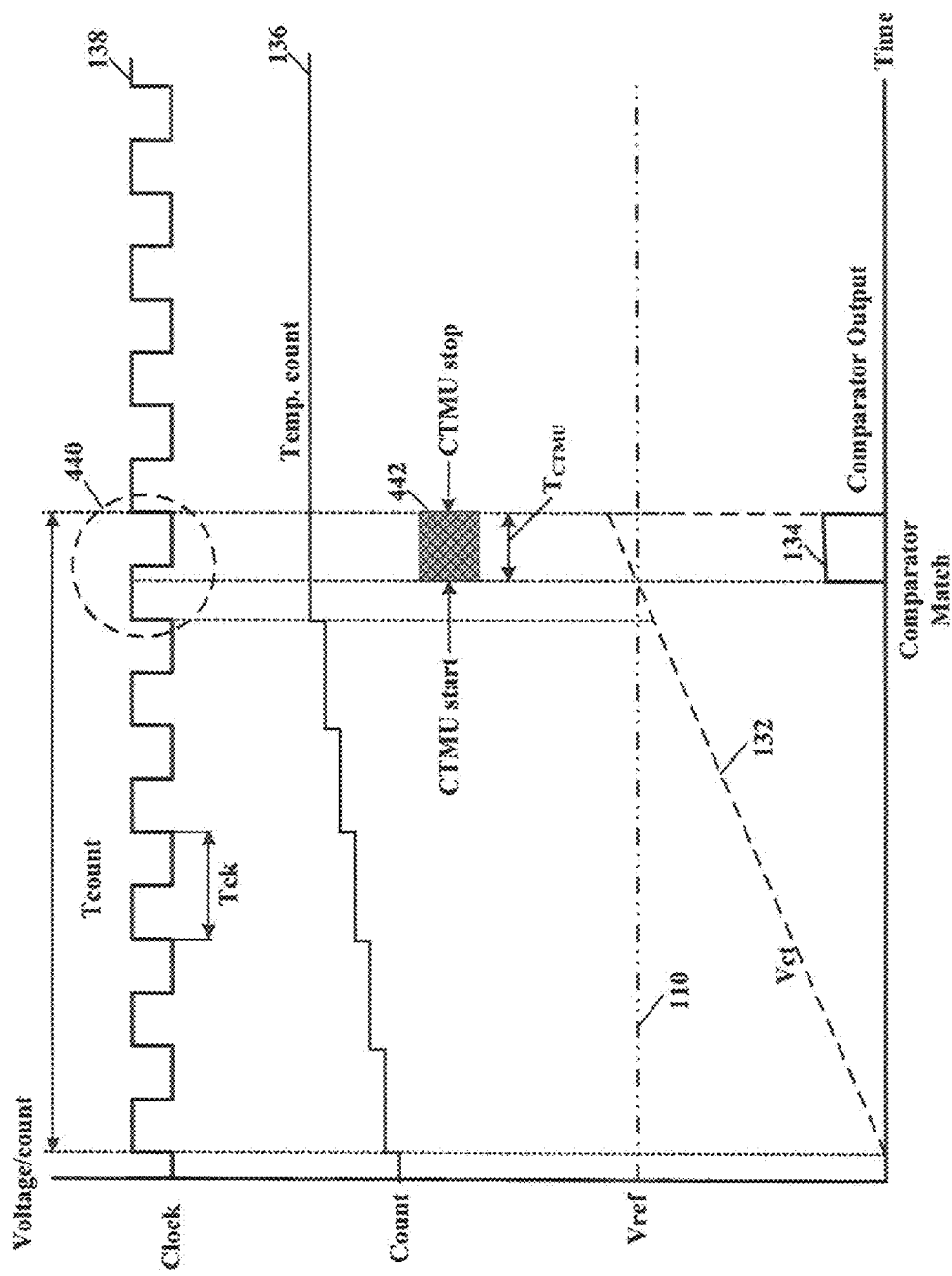
FIG. 4 illustrates a schematic graph showing voltage amplitude, and count values versus time of the temperature measurement circuit shown in FIG. 3, according to a specific example embodiment of this disclosure.

Referring to FIG. 4, depicted is a schematic graph showing voltage amplitude, and count values versus time of the temperature measurement circuit shown in FIG. 3, according to a specific example embodiment of this disclosure. The voltage 132, Vct, on the capacitor 104 generally will reach the reference voltage, Vref, value asynchronously at a time between the rising edges of the clock pulses 138. Since this asynchronous occurrence creates an ambiguity (resolution error 400) in the actual time measurement, a very precise temperature determination is not possible without increasing the clock frequency and number of bits of the counter 126 which is not desirable.

However in the fine time resolution circuit of FIG. 3, the timing circuit of the CTMU 350 is activated at the precise moment when the voltage 132, Vct, on the capacitor 104 reaches the reference voltage, Vref, and continues the fine timing until the next positive edge of a clock pulse 138. Now this asynchronous event has been closely timed and the time value, $T_{CTMU}$, may be used in determining a much more accurate time in combination with the course time derived from the count value of the counter 126. A very accurate and refined time when the voltage 132, Vct, on the capacitor 104 reaches the reference voltage, Vref, may then be determined by subtracting $T_{CTMU}$ from Tcount.

The aforementioned and described time based measurements offer advantages when coupled with an accurate current source. A charge time measurement unit (CTMU) in conjunction with an input capture peripheral can easily provide temperature measurements with a 0.005° C. resolution wherein sample rates of 10 kHz can also be achieved. According to various embodiments, a technique of using a constant current source is proposed. This provides enhanced resolution for the residual measurement whilst still allowing the temperature measurement counter to be clocked at moderate clock rates.

From the example given hereinabove, the CTMU 350 increases the resolution of the time measurement from 62.5 ns to less then 1 ns. In a realizable system this would result in a resolution of 0.001° C. or better.

Figure 5:
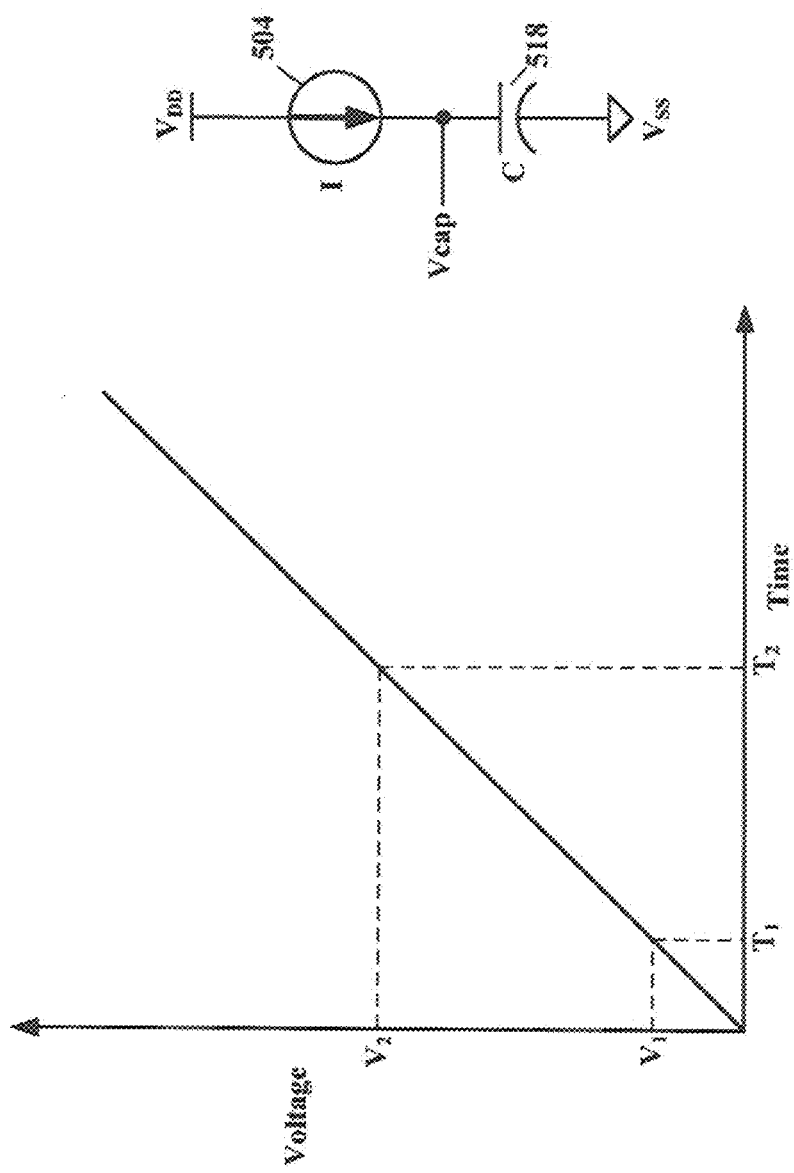
FIG. 5 illustrates a schematic time-voltage graph of a capacitor being charged from a constant current source.

The function of the CTMU 350 may better be understood by referring to FIG. 5, wherein a time-voltage graph of a capacitor 518 being charged from a constant current source 504 is depicted. When the capacitor 518 is charged through the constant current source 504, the voltage, Vcap, across the capacitor 518 increases linearly with time, according to the equation: I=C*dV/dT, where C is the capacitance value of the capacitor 518, I is the current from the constant current source 504 and V is the voltage on the capacitor 518 at time T. When any two values of the current, I; time, T; and voltage, V are known, the other unknown value may be calculated from the two known values. For example, if the capacitance of the capacitor 518 and the charging current from the constant current source 504 are known, then the time $T_1$ at voltage $V_1$ and the time $T_2$ at voltage $V_2$ may be determined using equation (1) above.

Figure 6:
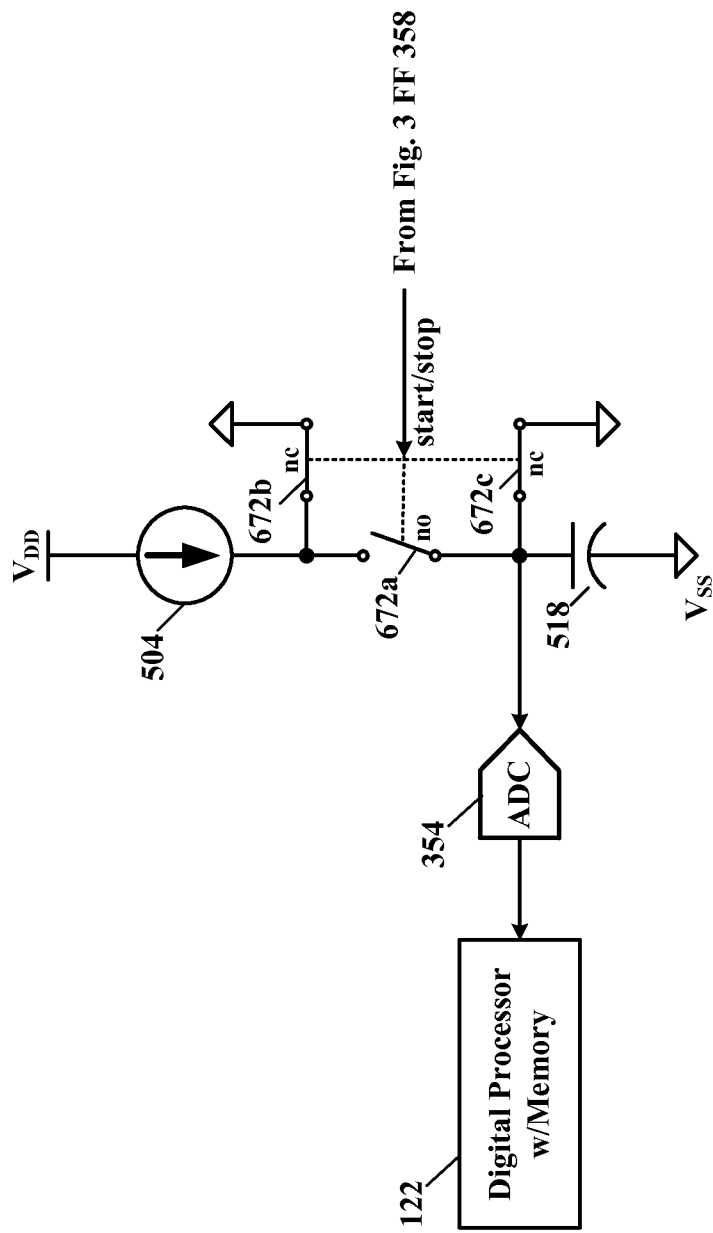
FIG. 6 illustrates a schematic diagram of an example CTMU as shown in FIG. 3, according to the teachings of this disclosure.

Referring to FIG. 6, depicted is a schematic diagram of an example CTMU as shown in FIG. 3, according to the teachings of this disclosure. When the Q-output of the flip-flop 358 is at a logic low ("0") switches 672b and 672c are closed and switch 672a is open. The capacitor 518 is thereby fully discharged and the voltage charge thereon is at zero volts. When the Q-output of the flip-flop 358 goes from a logic low ("0") to a logic high ("1"), switches 672b and 672c open and switch 672a closes, thereby coupling the constant current source 504 to the capacitor 518.

Precise timing is accomplished by charging the known value capacitor 518 with the known value constant current source 504 which provides a linearly increasing voltage charge value on the capacitor 518 that is proportional to an elapse time of when the Q-output of the flip-flop 358 is at a logic high ("1"). When Q-output of the flip-flop 358 goes back to a logic low ("0") the CTMU 350 is reset back to zero voltage charge. This elapse time represents the time from when the output 134 of the comparator 116 goes to a logic high ("1") to when the next positive edge of the clock 130 output occurs. As previously described hereinabove, this elapse time is subtracted from one clock count time, Tck, then added to the total time, Tcount, wherein the sum of the coarse and fine times precisely represent a temperature being measured by the resistive temperature sensor. Therefore the fine time based upon an asynchronous event is added to the coarse time based upon the synchronous counter time.

The CTMU is more fully described in Microchip application notes AN1250 and AN1375, available at www.microp-chip.com, and commonly owned U.S. Pat. No. 7,460,441 B2, entitled "Measuring a long time period;" and U.S. Pat. No. 7,764,213 B2, entitled "Current-time digital-to-analog converter," both by James E. Bartling; wherein all are hereby incorporated by reference herein for all purposes.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed:

1. An apparatus for measuring high resolution temperature, comprising:
   a clock providing a plurality of clock pulses, each of the plurality of clock pulses representing a coarse time increment;
   a counter having a dock input coupled to the dock for receiving the plurality of clock pulses, and a stop input for stopping the counter from counting a count value, wherein the count value represents a number of clock pulses counted by the counter;
   a first output driver having an output coupled to a first node;
   a second output driver having an output coupled to a second node;
   a resistive temperature sensor coupled between the first and second nodes;
   a charging capacitor coupled to the second node and a voltage common node;
   a voltage reference having a reference voltage output;
   a voltage comparator having a positive input coupled to the second node and a negative input coupled to the output of the voltage reference, wherein the voltage comparator compares a voltage on the charging capacitor coupled to the second node to the reference voltage from the voltage reference output;
   a charge time measurement unit (CTMU) for providing a timed charge to a CTMU timing capacitor;
   wherein when outputs of the first and second output drivers go from first logic levels to second logic levels the counter starts counting the number of clock pulses until after a voltage on the charging capacitor coupled to the second node is equal to the reference voltage, the CTMU starts the timed charge to the CTMU timing capacitor when the voltage on the charging capacitor is equal to the reference voltage and stops the timed charge at a next clock pulse from the clock;
   a digital processor for reading the count value from the counter, a voltage on the CTMU timing capacitor, calculating a coarse time from the count value, and a fine time from the voltage on the CTMU timing capacitor; and
   the digital processor further corrects the coarse time using the fine time and thereafter converts a resulting corrected time to a temperature value.

2. The apparatus according to claim 1, wherein the CTMU comprises:
   the CTMU timing capacitor;
   a constant current source; and
   first, second and third switches, wherein when the first and second switches are closed the timing capacitor has no charge thereon and when the third switch is open the constant current source is not connected to the timing capacitor, and when the first and second switches are open and the third switch is closed the constant current source is connected to the timing capacitor and charges the CTMU timing capacitor with the CTMU timed charge.

3. The apparatus according to claim 1, wherein the CTMU timed charge is represented by a voltage on the CTMU timing capacitor, an analog-to-digital converter (ADC) converts the voltage to a digital representation thereof, and the digital representation is read by the digital processor.

4. The apparatus according to claim 1, further comprising a memory coupled to the digital processor and storing a time-to-temperature table, wherein the digital processor uses a time-to-temperature table to determine the temperature value from the difference time.

5. The apparatus according to claim 1, wherein the digital processor calculates the temperature value from the difference time.

6. The apparatus according to claim 1, wherein the digital processor and memory are provided in a microcontroller.

7. The apparatus according to claim 1, wherein the resistive temperature sensor is a thermistor.

8. The apparatus according to claim 1, wherein the resistive temperature sensor is a resistive temperature device (RTD).

9. The apparatus according to claim 1, further comprising a temperature display coupled to the digital processor for displaying the temperature value.

10. The apparatus according to claim 1, wherein the second output driver is an open collector output driver.

11. The apparatus according to claim 1, wherein the second output driver is a tri-state output driver.

12. The apparatus according to claim 1, wherein the clock, counter, first and second output drivers, voltage comparator, CTMU and digital processor are fabricated on an integrated circuit die.

13. The apparatus according to claim 1, wherein the apparatus if formed within an integrated circuit die which is packaged in an integrated circuit package.

* * * * *